United States Patent [19]
Morman et al.

[11] Patent Number: 5,705,251
[45] Date of Patent: Jan. 6, 1998

[54] GARMENT WITH LIQUID INTRUSION PROTECTION

[75] Inventors: Michael Tod Morman; Laureen Cecilia Clark, both of Alpharetta, Ga.; Lynn Preston, Ft. Lauderdale, Fla.

[73] Assignee: Kimberly-Clark Worldwide, Inc., Neenah, Wis.

[21] Appl. No.: 580,411

[22] Filed: Dec. 28, 1995

Related U.S. Application Data

[63] Continuation of Ser. No. 495,122, Jun. 27, 1995, abandoned.

[51] Int. Cl.$^6$ .......................... A41D 13/02; A41D 13/12; B32B 7/04; B32B 7/14
[52] U.S. Cl. ...................... 428/114; 2/2; 2/901; 128/849; 428/195; 428/292.1; 442/382
[58] Field of Search ...................... 2/2, 901; 128/849; 428/114, 116, 195, 239, 240, 246, 283, 285, 286, 287, 292.1; 442/382

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney . | |
| 3,482,567 | 12/1969 | Franklin | 128/132 |
| 3,542,615 | 11/1970 | Dobo et al. | 156/181 |
| 3,598,689 | 8/1971 | Feffer | 428/294 |
| 3,692,618 | 9/1972 | Dorschner et al. . | |
| 3,707,433 | 12/1972 | Clough et al. | 428/294 |
| 3,770,562 | 11/1973 | Newman . | |
| 3,802,817 | 4/1974 | Matsuki et al. | 425/66 |
| 3,849,241 | 11/1974 | Butin et al. . | |
| 3,855,046 | 12/1974 | Hansen et al. . | |
| 3,909,009 | 9/1975 | Cvetko et al. | 274/37 |
| 3,973,067 | 8/1976 | Newman | 428/195 |
| 3,974,308 | 8/1976 | Winters | 427/244 |
| 4,041,203 | 8/1977 | Brock et al. | 428/157 |
| 4,196,245 | 4/1980 | Kitson et al. | 428/198 |
| 4,307,143 | 12/1981 | Meitner | 252/91 |
| 4,308,303 | 12/1981 | Mastroianni et al. | 428/90 |
| 4,340,563 | 7/1982 | Appel et al. | 264/518 |
| 4,344,999 | 8/1982 | Gohlke | 428/212 |
| 4,374,888 | 2/1983 | Bornslaeger | 428/198 |
| 4,390,575 | 6/1983 | Kopp | 428/114 |
| 4,499,139 | 2/1985 | Schortmann | 428/245 |
| 4,522,863 | 6/1985 | Keck et al. | 428/196 |
| 4,618,524 | 10/1986 | Groitzsch et al. | 428/198 |
| 4,622,259 | 11/1986 | McAmish et al. | 428/171 |
| 4,647,492 | 3/1987 | Grant | 428/198 |
| 4,663,220 | 5/1987 | Wisneski et al. | 428/221 |
| 4,756,786 | 7/1988 | Malaney | 156/308.2 |
| 4,774,125 | 9/1988 | McAmish | 428/198 |
| 4,858,547 | 8/1989 | Sternlieb | 428/114 |
| 5,107,859 | 4/1992 | Alcorn et al. | 128/853 |
| 5,165,979 | 11/1992 | Watkins et al. | 428/113 |
| 5,204,174 | 4/1993 | Daponte et al. | 428/286 |
| 5,213,881 | 5/1993 | Timmons et al. | 428/224 |

FOREIGN PATENT DOCUMENTS 1 188 452   6/1985   Canada .

*Primary Examiner*—James C. Cannon
*Attorney, Agent, or Firm*—David J. Alexander

[57] ABSTRACT

A multi-layered structure having improved liquid barrier properties is provided. The multi-layered structure includes a porous hydrophobic layer and a spacing layer adjacent to and in juxtaposition with the porous hydrophobic layer. The function of the spacing layer is to provide sufficient channels for a liquid while supporting all or substantially all of a compressive pressure exerted against the spacing layer. As such, when the spacing layer is contacted with a liquid, such as water, saline or a bodily fluid such as blood, and subjected to a compressive pressure, of at least 2 psi, applied generally perpendicularly to the spacing layer, the channels are available within the bulk of the spacing layer for such liquid to flow therein or therebetween, while all or substantially all of the compressive pressure is supported by the spacing layer. In this way, the liquid in contact with the spacing layer flows into these channels without passing through the porous hydrophobic layer.

44 Claims, 3 Drawing Sheets

GARMENT WITH LIQUID INTRUSION PROTECTION

This application is a continuation of application Ser. No. 08/495,122, filed in the U.S. Patent and Trademark Office on Jun. 27, 1995 and now abandoned.

FIELD OF THE INVENTION

The present invention relates to protective garments. More particularly, the present invention relates to protective garments formed from nonwoven fabrics having improved liquid barrier properties.

BACKGROUND OF THE INVENTION

There are many types of limited use or disposable protective garments designed to provide barrier properties. Protective garments should be resistant to penetration by liquids. For a variety of reasons, it is undesirable for liquids and/or pathogens which may be carried by liquids to pass through the protective garment and to contact persons working in an environment where pathogens are present.

Examples of protective garments include disposable coveralls and disposable surgical garments such as disposable surgical gowns and drapes. As is generally known, surgical gowns and drapes are designed to greatly reduce, if not prevent, the transmission through the surgical garment of liquids and biological contaminants which may become entrained therein. In surgical procedure environments, such liquid sources include the gown wearer's perspiration, patient liquids such as blood, saliva, perspiration and life support liquids such as plasma and saline.

Many surgical garments were originally made of cotton or linen and were sterilized prior to their use in the operating room. These surgical garments, however, permitted strike-through by many of the liquids encountered in surgical procedures. Strike-through generally refers to the transmission or passage of a liquid from one side of a material layer, such as surgical gown fabric, through the material layer and on to the other side of the material layer. Generally, strike-through occurs for a hydrophobic material when a pressure is applied to a liquid on the surface of the porous fabric. For strike-through to occur, the pressure must be sufficient to drive the liquid into and through the fabric.

As such, surgical garments made of cotton or linen and which permitted strike-through were undesirable, if not unsatisfactory, because such strike-through established a direct path for transmission of bacteria and other contaminants to and from the wearer of the surgical garment. Furthermore, these surgical garments were costly, and, of course, laundering and sterilization procedures were required before reuse.

Disposable surgical garments have largely replaced linen surgical gowns. Because many surgical procedures require generally a high degree of liquid repellency to prevent strike-through, disposable surgical garments for use under these conditions are, for the most part, made entirely from liquid repellent fabrics.

Therefore, generally speaking, it is desirable that disposable protective garments be made from fabrics that are relatively impervious to liquids and/or particulates. These barrier-type fabrics must also be suited for the manufacture of protective apparel at such low cost that make discarding the garments after only a single use economical.

Examples of disposable protective garments which are generally manufactured from nonwoven web laminates in order to assure that they are cost effectively disposable are coveralls, surgical gowns and surgical drapes sold by the Kimberly-Clark Corporation. Many of the disposable protective garments sold by Kimberly-Clark Corporation are manufactured from a porous three ply nonwoven web laminate. The two outer plies are formed from spunbond fibers and the inner ply is formed from meltblown microfine fibers. The outer plies of spunbond provide tough, durable and abrasion resistant surfaces. The inner ply is not only water repellent but acts as a breathable filter barrier allowing air and moisture vapor to pass through the bulk of the fabric while filtering out many harmful particles.

In some instances when porous nonwoven fabrics are contacted or are "insulted" by liquids and when a sufficient pressure is applied against the liquid-insulted porous nonwoven fabric, such liquids may be driven through the fabric pores such that strike-through occurs. An example of such an instance would be when a surgical gown, formed from a porous fabric and worn by surgical personnel, is contacted by or becomes coated with a liquid. During the course of performing surgical procedures, the liquid insulted gown may be compressed between the wearer's body and an object, such as the operating room table, with sufficient pressure such that strike-through occurs.

In some instances, such protective garments may include a film layer or a film laminate. While forming protective garments from a film may improved liquid and particle barrier properties of the protective garment, such film or film-laminated materials may also inhibit or prevent the passage of air and moisture vapor therethrough. Generally, protective garments formed from materials which are not sufficiently porous so as to allow sufficient passage of air and moisture vapor therethrough become uncomfortable to wear correctly for extended periods of time. As such, while in some instances, film or film-laminated materials may provide improved liquid and particulate barrier properties as compared to porous nonwoven-laminated fabrics, porous nonwoven-laminated fabrics generally provide greater wearer comfort.

Therefore, a need exists for inexpensive disposable protective garments, and more particularly inexpensive disposable protective garments formed from a porous nonwoven fabric which provides improved liquid barrier properties such that said fabric more effectively resists pressure-induced strike-through. And more particularly, a need exists for a porous nonwoven fabric which more effectively resists pressure-induced strike-through while also being breathable and thus comfortable to wear correctly for extended periods of time.

SUMMARY OF THE INVENTION

In response to the above need for a nonwoven fabric having improved liquid barrier properties, the present invention provides a multi-layered structure which is suitable for forming a protective garment such as a coverall, surgical drape, or surgical gown. In one embodiment, the multi-layered structure includes a porous hydrophobic layer and a spacing layer. Upon contacting the spacing layer with an aqueous liquid, such as water, and subjecting the liquid-contacted spacing layer to a compressive pressure of at least 2 pounds per square inch (psi), and desirably, a compressive pressure of at least 5 psi and more desirably, a compressive pressure of at least 10 psi, none of the liquid passes through the porous hydrophobic layer. The porous hydrophobic layer may be formed from a nonwoven web. The spacing layer may be formed from materials, such as for example, glass fibers, thermoplastic fibers, cellulose fibers, a plurality of spaced apart support members or any combination thereof. The support members may be corrugated and may be spaced apart such that the area between the support members defines a channel.

In another embodiment, the present invention provides a multi-layered nonwoven web. The multi-layered nonwoven web includes a hydrophobic nonwoven web layer spaced a distance apart from a nonwoven web layer by a spacing layer. Upon contacting the nonwoven web layer with an aqueous liquid, such as water, and subjecting the liquid-contacted nonwoven web layer to a compressive pressure of at least 2 psi, and desirably, a compressive pressure of at least 5 psi and more desirably, a compressive pressure of at least 10 psi, none of the liquid passes through the hydrophobic nonwoven web layer. The nonwoven web layers may be formed from a plurality of plies. The spacing layer may be formed from materials, such as for example, glass fibers, thermoplastic fibers, cellulose fibers, a plurality of spaced apart support members or any combination thereof. The support members may be corrugated and may be spaced apart such that the area between the support members defines a channel.

DETAILED DESCRIPTION OF THE INVENTION

As used herein, the term "nonwoven web" refers to a web that has a structure of individual fibers or filaments which are interlaid, but not in an identifiable repeating manner. As used herein the term "spunbond fibers" refers to fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763 and 3,909,009 to Levy, and U.S. Pat. No. 3,542,615 to Dobo et al which are all herein incorporated by reference. Spunbond fibers are generally continuous and larger than 7 microns, more particularly, having an average diameter greater than 10 microns.

As used herein the term "meltblown fibers" means fibers formed by extruding a molten thermoplastic material through a plurality of fine, usually circular, die capillaries as molten threads or filaments into a high velocity, usually heated gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Meltblowing is described, for example, in U.S. Pat. No. 3,849,241 to Buntin, U.S. Pat. No. 4,307,143 to Meitner et al., and U.S. Pat. No. 4,663,220 to Wisneski et al which are all herein incorporated by reference. Meltblown fibers are microfibers which generally have an average diameter smaller than 10 microns.

As used herein, the term "micro fine fibers" or "microfibers" means fibers having an average diameter not greater than about 100 microns, for example, having a diameter from about 0.5 microns to about 50 microns, more specifically microfibers may also have an average diameter from about 1 micron to about 20 microns. Microfibers having an average diameter of about 3 microns or less are commonly referred to as ultra-fine microfibers. A description of an exemplary process of making ultra-fine microfibers may be found in, for example, for example, U.S. Pat. No. 5,213,881, entitled "A Nonwoven Web With Improved Barrier Properties", which is incorporated herein by reference.

Figure 1:
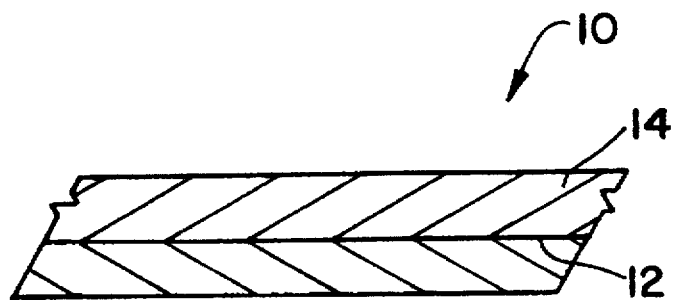
FIG. 1 is a segmented, cross-sectional view of the multi-layered structure of the present invention.

Turning now to drawings and with reference to FIG. 1, the multi-layered structure of the present invention is indicated by reference numeral 10. The multi-layered structure 10 includes a porous hydrophobic layer 12 in adjacent, juxtaposition to a spacing layer 14. Desirably, the hydrophobic layer 12 is secured to the spacing layer 14. It will be understood by those skilled in the art that the hydrophobic layer 12 may be secured to the spacing layer 14 by any number of well known techniques. Several of these techniques are more fully described below. As will also be understood by those skilled in the art, the use of any one of these techniques is generally dependent upon the materials used to form both the hydrophobic layer 12 and the spacing layer 14.

The porous hydrophobic layer 12 may be a woven or nonwoven web. These webs may be formed from natural or synthetic fibers. In the case of synthetic fibers, polymers and particularly thermoplastic polymers are well suited for the formation of fibers or filaments used in forming the nonwoven webs. Nonwoven webs can be made from a variety of processes including, but not limited to, air laying processes, wet laid processes, hydroentangling processes, spunbonding, meltblowing, staple fiber carding and bonding.

By way of example only, thermoplastic polymers may include, end-capped polyacetals, such as poly (oxymethylene) or polyformaldehyde, poly (trichloroacetaldehyde), poly(n-valeraldehyde), poly (acetaldehyde), poly(propionaldehyde), and the like; acrylic polymers, such as poly(ethyl acrylate), poly(methyl methacrylate), and the like; fluorocarbon polymers, such as perfluorinated ethylene-propylene copolymers, ethylene-tetrafluoroethylene copolymers, poly (chlorotrifluoroethylene), ethylenechlorotrifluoroethylene copolymers, poly(vinylidene fluoride), poly(vinyl fluoride), and the like; polyamides, such as poly(6-aminocaproic acid) or poly(ε-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy- 1,4-phenylene-isopropylidene-1,4-phenylene), poly (sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as a polypropylene-ethylene, polypropylenepolyethylene, polyethylene-polyvinyl alcohol, acrylonitrile-butadiene-styrene (ABS) copolymers, and the like.

It has been found that nonwoven webs formed from thermoplastic fibers and particularly polyolefin-based fibers are particularly well-suited for the above applications. Examples of such fibers include spunbond fibers and meltblown fibers. Examples of such nonwoven webs formed from such fibers are the polypropylene nonwoven webs produced by the Assignee of record, Kimberly-Clark Corporation.

When the porous hydrophobic layer 12 is a web of spunbond fibers, the spunbond fibers may desirably be formed from polyolefin polymers, and more particularly polypropylene having a melt flow rate (MFR) of between 9 and 1000 grams per 10 minutes, and still more particularly between 9 and 100. The MFR is an indication of the viscosity of the polymer with a higher number indicating a lower viscosity. Suitable polypropylenes for the spunbond layers are commercially available as PD-9355 from the Exxon Chemical Company of Baytown, Tex. The fibers of the spunbond layer should be of small diameter, desirably having a denier in the range of 1.0 to 6.0.

When the porous hydrophobic layer 12 is a web of meltblown fibers, the meltblown fibers may desirably be formed from polyolefin polymers, and more particularly polypropylene. Nonexclusive examples such meltblown fibers are contained in U.S. Pat. Nos. 5,165,979 and 5,204,174 which are incorporated herein by reference.

In one embodiment, the porous hydrophobic layer 12 may be formed from a plurality of nonwoven web plies. These nonwoven web plies may be generally bonded together in some manner as they are produced in order to give them sufficient structural integrity to withstand the rigors of further processing into a finished product. Bonding can be accomplished in a number of ways such as hydroentanglement, needling, ultrasonic bonding, adhesive bonding and thermal bonding. Ultrasonic bonding is performed, for example, by passing the nonwoven web plies between a sonic horn and anvil roll as illustrated in U.S. Pat. No. 4,374,888 to Bornslaeger.

Thermal bonding of nonwoven web layers and/or plies may be accomplished by passing the same between the rolls of a calendering machine. At least one of the rollers of the calender is heated and at least one of the rollers, not necessarily the same one as the heated one, has a pattern. The pattern is imprinted upon the nonwoven web layers and/or plies as they pass between the rollers. As the fabric passes between the rollers, it is subjected to pressure as well as heat. The combination of heat and pressure applied in a particular pattern results in the creation of fused bond areas in the nonwoven web layers and/or plies, wherein the bond areas correspond to the pattern of bond points on the calender roll.

Various patterns for calender rolls have been developed. One example is the Hansen-Pennings pattern with between about 10 to 25% bond area with about 100 to 500 bonds/square inch as taught in U.S. Pat. No. 3,855,046. Another common pattern is a diamond pattern with repeating and slightly offset diamonds. Furthermore, any otherwise desirable bond pattern will be satisfactory for use in the present invention.

The exact calender temperature and pressure for bonding nonwoven webs depend on thermoplastic(s) used in forming the nonwoven webs. Generally for nonwoven webs formed from polyolefins, the desired temperature range for the heated roll is between 150° and 350° F. (66° and 177° C.) and the pressure range at the nip is between 300 and 1000 pounds per lineal inch. More particularly, for polypropylene, the desired temperature range is between 270° and 320° F. (132° and 160° C.) and the pressure range is between 400 and 800 pounds per lineal inch.

In those instances where the multi-layered structure 10 is used in or around flammable materials and static discharge is a concern, it may be treated with any number of antistatic materials. In these instances, the antistatic material may be applied by any number of techniques including, but not limited to dipping the multi-layered structure 10 into a solution containing the antistatic material or by spraying the multi-layered structure 10 with a solution containing the antistatic material. Of particular usefulness is the antistat or antistatic material known as ZELEC®, an alcohol phosphate salt product of the Du Pont Corporation.

Additionally, in those instances when the multi-layered structure 10 may come in contact with alcohol, it may be treated with an alcohol repellent material. In these instances, the alcohol repellent material may be applied by any number of techniques including, but not limited to dipping or by spraying with a solution containing the alcohol repellent material.

When the porous hydrophobic layer 12 is formed from spunbond or meltblown layers, particularly useful alcohol repellent materials are those formed from fluorinated urethane derivatives, an example of which includes FX-1801. FX-1801 is available from the 3M Company of St. Paul, Minn. FX-1801 has a melting point of about 130° to 138° C. FX-1801 may be added to either the spunbond and/or meltblown layer and/or ply at an amount of about 0.1 to about 2.0 weight percent or more particularly between about 0.25 and 1.0 weight percent. FX-1801 may be topically applied or may be internally applied by adding the FX-1801 to the fiber forming polymer prior to fiber formation.

Generally, internal applied additives, such as the alcohol repellent additive FX-1801, suitable for use in the present invention should be non-toxic and have a low volatility. Additionally, the internal additive should be thermally stable at temperatures up to 300° C., and sufficiently soluble in the molten or semi-molten fiber forming polymer. The internal additive should also sufficiently phase separate such that said additive migrates from the bulk of the polymer fiber toward the surface of the polymer fiber as the fiber cools without requiring the addition of heat.

The multi-layered structure 10 and, particularly, the porous hydrophobic layer 12 may also contain fire retardants for increased resistance to fire, pigments to give each layer the same or distinct colors, and/or chemicals such as hindered amines to provide enhanced ultraviolet light resistance. Fire retardants and pigments for spunbond and meltblown thermoplastic polymers are known in the art and are internal additives. A pigment, if used, is generally present in an amount less than 5 weight percent of the layer.

The function of the spacing layer 14 is to provided sufficient channel volume for a liquid while supporting all or substantially all of a compressive pressure exerted against the spacing layer 14. As such, when the spacing layer 14 is contacted with a liquid, such as water, saline or a bodily liquid such as blood, and subjected to a compressive pressure of at least 2 psi, and desirably, a compressive pressure of at least 5 psi and more desirably, a compressive pressure of at least 10 psi, applied generally perpendicularly to the spacing layer 14, the channels are available within the bulk of the spacing layer 14 for such liquid to flow therein or therebetween, while all or substantially all of the compressive pressure is supported by the spacing layer 14. In this way, the liquid in contact with the spacing layer 14 flows into the channels within the bulk of the spacing layer 14 without passing through the porous hydrophobic layer 12. An example of a compressive pressure is, but is not limited to, the pressure generated by a surgeon's chest pressing against an object such as an operating room table or portion of a patient's body.

The spacing layer 14 may be formed from a variety of materials. These materials include, but are not limited to, glass fibers, webs formed from glass fibers, thermoplastic fibers, webs formed from thermoplastic fibers, cellulose fibers, webs formed from cellulose fibers, foam, webs formed from foam or any combination thereof. When the spacing layer 14 is a web formed from thermoplastic fibers, the web may be a nonwoven web formed from thermoplastic fibers as described above.

The spacing layer 14 may also be formed from a plurality of support members. These support members may further be defined as a plurality of strips, a plurality of rods, a plurality of tubes, a plurality of dome shaped structures (which may be continuous or discontinuous), or a combination of two or more thereof. Additionally, the spacing layer 14 may be formed from a combination of support members and one or more of the materials previously described above as suitable for forming the spacing layer 14.

In one embodiment, the support members may be corrugated, as described in greater detail below. In another embodiment, the support members may be spaced apart. In another embodiment, the support members may contact or intersect each other. And still in another embodiment portions of such support members may be spaced apart while other portions of the support members contact or intersect each other.

Where the spacing layer 14 is in the form of strips, materials useful for forming such strips, include, solids, fibers, foams, and tubes made from glass, thermoplastics, thermosets and pulp. In one embodiment, the length dimension of the strip is larger than the width dimension of the strip and the width dimension of the strip is larger than the height dimension of the strip. Materials useful for forming such rods, tubes or dome shaped structures include thermoplastic polymers and elastic materials. The spacing layer 14 may be secured to the porous hydrophobic layer 12 by several conventional methods. By way of example and not limitation, these methods include stitching, gluing, heat sealing, and sonic or thermal bonding and other methods familiar to those skilled in the art.

Figure 2:
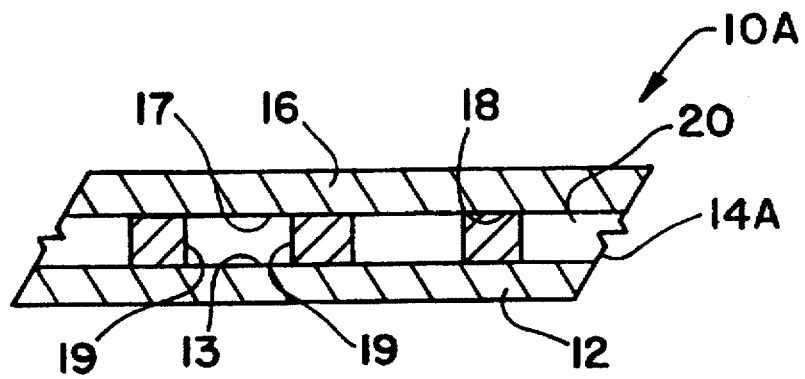
FIG. 2 is a segmented, cross-sectional view of another embodiment of the multi-layered structure of the present invention.

Referring now to FIG. 2, another embodiment of a multi-layered structure 10A of the present invention is illustrated. The multi-layered structure 10A is similar to the multi-layered structure 10 except that the porous hydrophobic layer 12 is spaced a distance apart from a porous layer 16 by the spacing layer 14A. A plurality of spaced apart strips 18 form the spacing layer 14A. The spacing layer also includes a plurality of channels 20. Generally, the channel 20 is defined by the inwardly facing surfaces 13 and 17 of the hydrophobic layer 12 and the porous layer 16, respectively, and the facing side walls 19 of a pair of adjacent strips 18.

Desirably, the dimension and composition of the strips 18 and the spacing of the strips 18 are sufficient to prevent the surface 13 of the hydrophobic layer 12 from contacting the surface 17 of the porous layer 16. More desirably, the composition and dimension of the strips 18 and the spacing of the strips 18 are sufficient to prevent the surface 13 of the hydrophobic layer 12 from contacting the surface 17 of the porous layer 16 when a compressive pressure of at least 2 psi, and desirably, a compressive pressure of at least 5 psi and more desirably, a compressive pressure of at least 10 psi is applied generally perpendicularly to the porous layer 16.

The porous layer 16 may be hydrophilic or hydrophobic and may be similar in form and shape to the porous hydrophobic layer 12. The porous layer 16 may also be formed from materials suitable for forming the porous hydrophobic layer 12.

The function of the spacing layer 14A of the multi-layered structure 10A is to provide sufficiently sized channels for a liquid to flow therein while supporting all or substantially all of a compressive pressure exerted generally perpendicularly against the porous layer 16. As such, when the porous layer 16 is contacted with a liquid, such as water, saline or a bodily liquid such as blood, and is subjected to a compressive pressure of at least 2 psi, and desirably, a compressive pressure of at least 5 psi and more desirably, a compressive pressure of at least 10 psi, desirably, the liquid passes through the bulk of the porous layer 16 and contacts the spacing layer 14A. Under such compressive pressure, the liquid enters the channels 20 of the spacing layer 14A. In this way, the liquid may travel within the channels 20 of the spacing layer 14A while all or substantially all of the compressive pressure is supported by the spaced apart strips 18. In this way, the liquid in contact with the spacing layer 14 flows into the channels 20 without passing through the porous hydrophobic layer 12.

Figure 3:
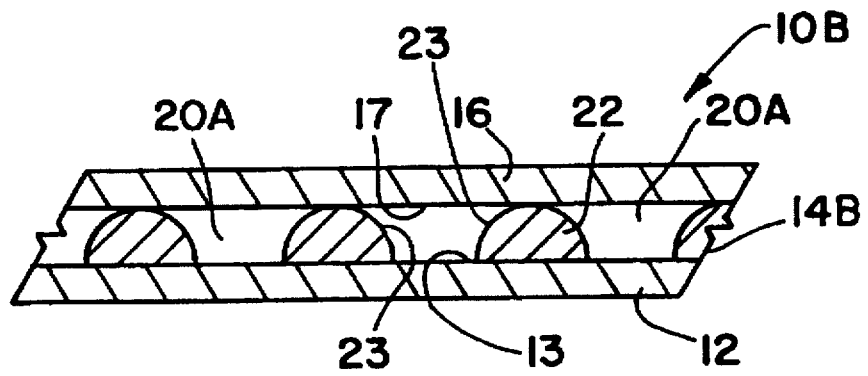
FIG. 3 is a segmented, cross-sectional view of another embodiment of the multi-layered structure of the present invention.

Referring now to FIG. 3, yet another embodiment of a multi-layered structure 10B of the present invention is illustrated. The multi-layered structure 10B is similar to the multi-layered structure 10A except that a plurality of spaced apart dome-shaped structures 22 form the spacing layer 14B. As previously mentioned, the dome-shaped structures may be either continuous, as in the form of a rods, or discontinuous, as in the form of individual drops or beads. The spacing layer 14B also includes a plurality of channels 20A. Generally, these channels 20A are defined by the surfaces 13 and 17 of the hydrophobic layer 12 and the porous layer 16, respectively, and the side walls 23 of a pair of adjacent dome-shaped structures 22.

Desirably, the composition and dimension of the dome-shaped structures 22 and their spacings are sufficient to prevent the surface 13 of the hydrophobic layer 12 from contacting the surface 17 of the porous layer 16. More desirably, the dimension and composition of the dome-shaped structure 22 and their spacing are sufficient prevent the surface 13 of the hydrophobic layer 12 from contacting the surface 17 of the porous layer 16 when a compressive pressure of at least 2 psi, and desirably, a compressive pressure of at least 5 psi and more desirably, a compressive pressure of at least 10 psi is applied generally perpendicularly to the plane of the porous layer 16.

The function of the spacing layer 14B is similar to the function of the spacing layer 14A except that the liquid contacting the spacing layer 14 within the bulk of the spacing layer 14B flows into the channels 20A. In this way, when the porous layer 16 is contacted with a liquid, such as water, saline or a bodily liquid such as blood, and subjected to a compressive pressure of at least 2 psi, and desirably, a compressive pressure of at least 5 psi and more desirably, a compressive pressure of at least 10 psi applied generally perpendicularly to the porous layer 14B, the liquid passes through the bulk of the porous layer 16 and into the channels 20A and does not pass through the porous hydrophobic layer 12.

Figure 4:
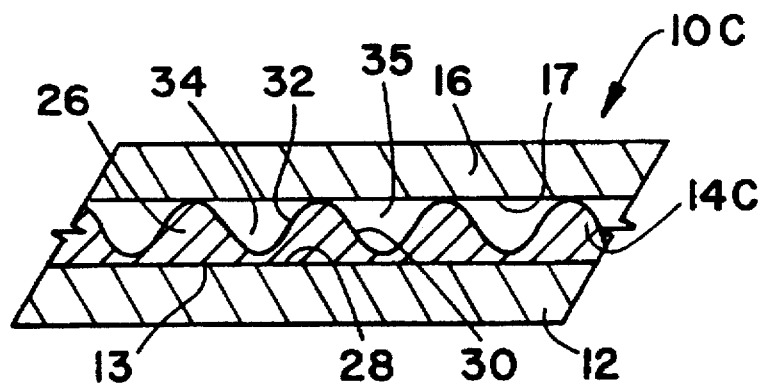
FIG. 4 is a segmented, cross-sectional view of another embodiment of the multi-layered structure of the present invention.

Referring now to FIG. 4, still another embodiment of a multi-layered structure 10C of the present invention is illustrated. The multi-layered structure 10C is similar to the multi-layered structure 10A except that a plurality of corrugated spacing structures 26 form the spacing layer 14C. The spacing layer 14C also defines a plurality of channels 35.

In one embodiment, the corrugated spacing structure 26 may be in the form of a strip having a first surface 28 and a second surface 30. The surface 28 is substantially planar while the surface 30 is provided with a plurality of alternating ridges 32 and valleys 34. The ridges 32 and the valleys 34, in conjunction with the surface 17 of the porous layer 16 further define the channels 35. Desirably, as illustrated in FIG. 4, the substantially planar surface 28 is in contact with the porous hydrophobic layer 12 and a plurality of the apexes of the ridges 32 are in contact with the porous layer 16. The height of the apexes of the ridges 32 may generally be uniform.

Desirably, the composition and dimensions of the corrugated spacing structures 26 and their orientation within the spacing layer 14C are sufficient to prevent the surface 17 of the hydrophobic layer 12 from contacting the valleys 34 of the corrugated spacing structure 26. More desirably, the composition and dimension of the corrugated spacing structures 26 and their orientation within the spacing layer 14C are sufficient to prevent the surface 13 of the hydrophobic layer 12 from contacting the valleys 34 of the corrugated spacing structure 26 when a compressive pressure of at least 2 psi, and desirably, a compressive pressure of at least 5 psi and more desirably, a compressive pressure of at least 10 psi is applied generally perpendicularly to the porous layer 16. The corrugated spacing structures 26 may be oriented within the spacing layer 14C such that they do not intersect or contact. Alternatively, the corrugated spacing structures 26 may be oriented within the spacing layer 14C such that they intersect or contact. Additionally, the corrugated spacing structures 26 may be oriented within the spacing layer 14C such that two or more adjacent corrugated spacing structures 26 contact each other. In this last instance, the peaks 32 and the valleys 34 of two or more adjacent corrugated spacing structures 26 may align or, the peaks 32 and the valleys 34 of two or more adjacent corrugated spacing structures 26 may be offset.

The function of the spacing layer 14C of the multi-layered structure 10C is similar to the function of the spacing layers 14A and 14B. In this way, when the porous layer 16 is contacted with a liquid, such as water, saline or a bodily liquid such as blood, and subjected to a compressive pressure of at least 2 psi, and desirably, a compressive pressure of at least 5 psi and more desirably, a compressive pressure of at least 10 psi applied generally perpendicularly to the porous layer 16, the liquid passes through the bulk of the porous layer 16 into the spacing layer 14C, and desirably, into the channels 35 of the spacing layer 14C and does not pass through the porous hydrophobic layer 12.

Figure 5:
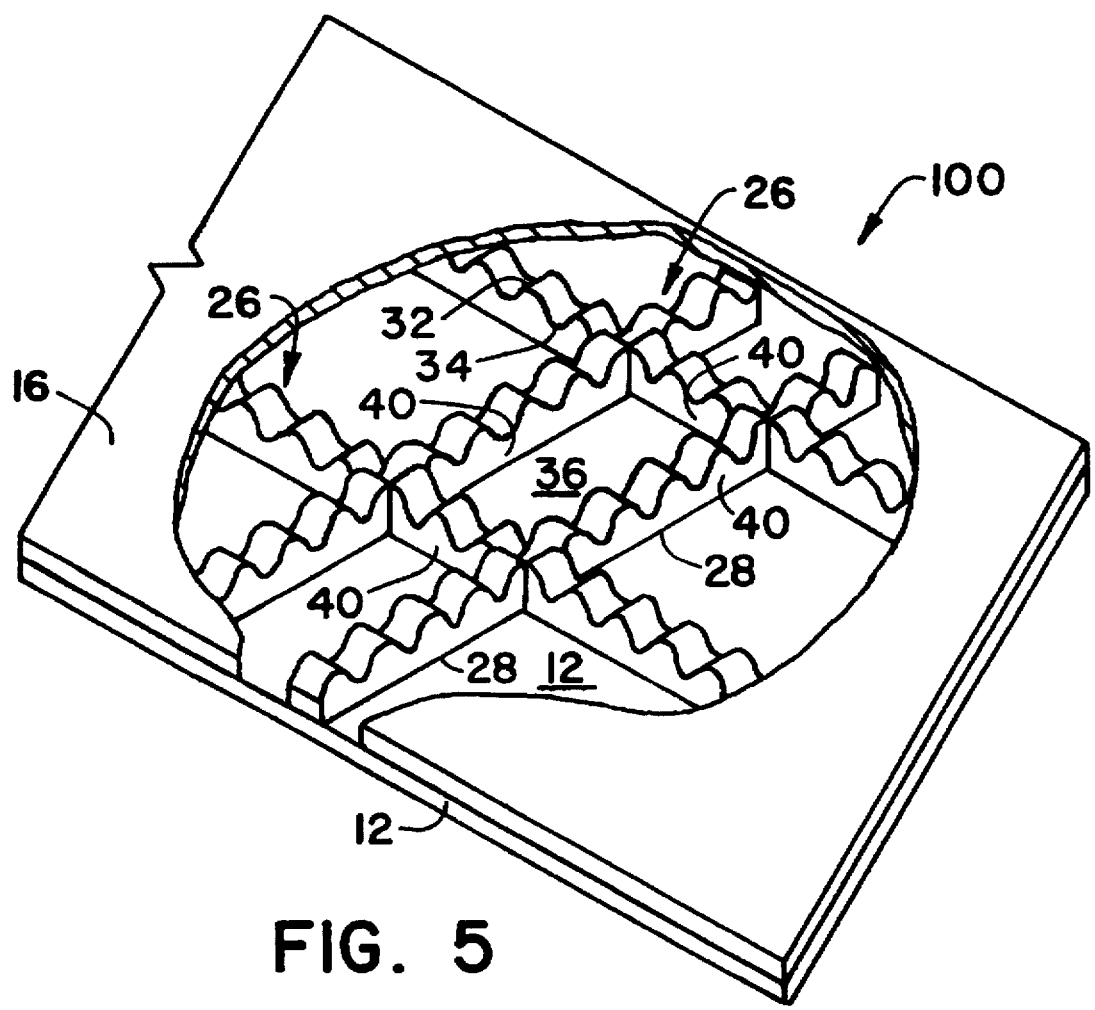
FIG. 5 is a perspective view of the embodiment illustrated in FIG. 4, with portions removed for clarity of illustration.

Referring now to FIG. 5, a multi-layered structure 10D is illustrated with a portion of the porous layer 16 removed for clarity of illustration. The planar surface 28 of the corrugated spacing structures 26 is adjacent to the porous hydrophobic layer 12. In this instance, the corrugated spacing structures 26 are arranged in an intersecting pattern. Side walls 40 of the corrugated spacing structures 26 in conjunction with surfaces 13 and 17 of the porous hydrophobic layer 12 and the porous layer 16, respectively, define the areas 36. In this embodiment, although the side walls 40 adjacent the respective planar surfaces 28 are continuous, the channels 35 defined by the ridges 32 and valleys 34 of the surface 30 allow for the communication of liquid between adjacent areas 36. For example, upon the application of a sufficient compressive pressure on a portion of the porous layer 16 contacted by a liquid, such as water, saline or a bodily liquid such as blood, the liquid passes through the porous layer 16. As the liquid passes through the porous layer 16, it enters areas 36. Once the liquid is in the areas 36, the channels 35 permit the liquid to communicate between adjacent areas 36. Such liquid communication may occur between one or more of the areas 36 when the compressive pressures exerted against the multi-layered structure 10D are insufficient to occlude or block the respective channels 35. Such liquid communication may also occur between one or more of the areas 36 when the compressive pressure is sufficient to momentarily occlude or block the channels 35. In this instance, while liquid within the area 36 is prevented from communication with other areas 36 when the channels 35 are momentarily occluded, such liquids are able to so communicate when the channels 35 reopen.

Figure 6:
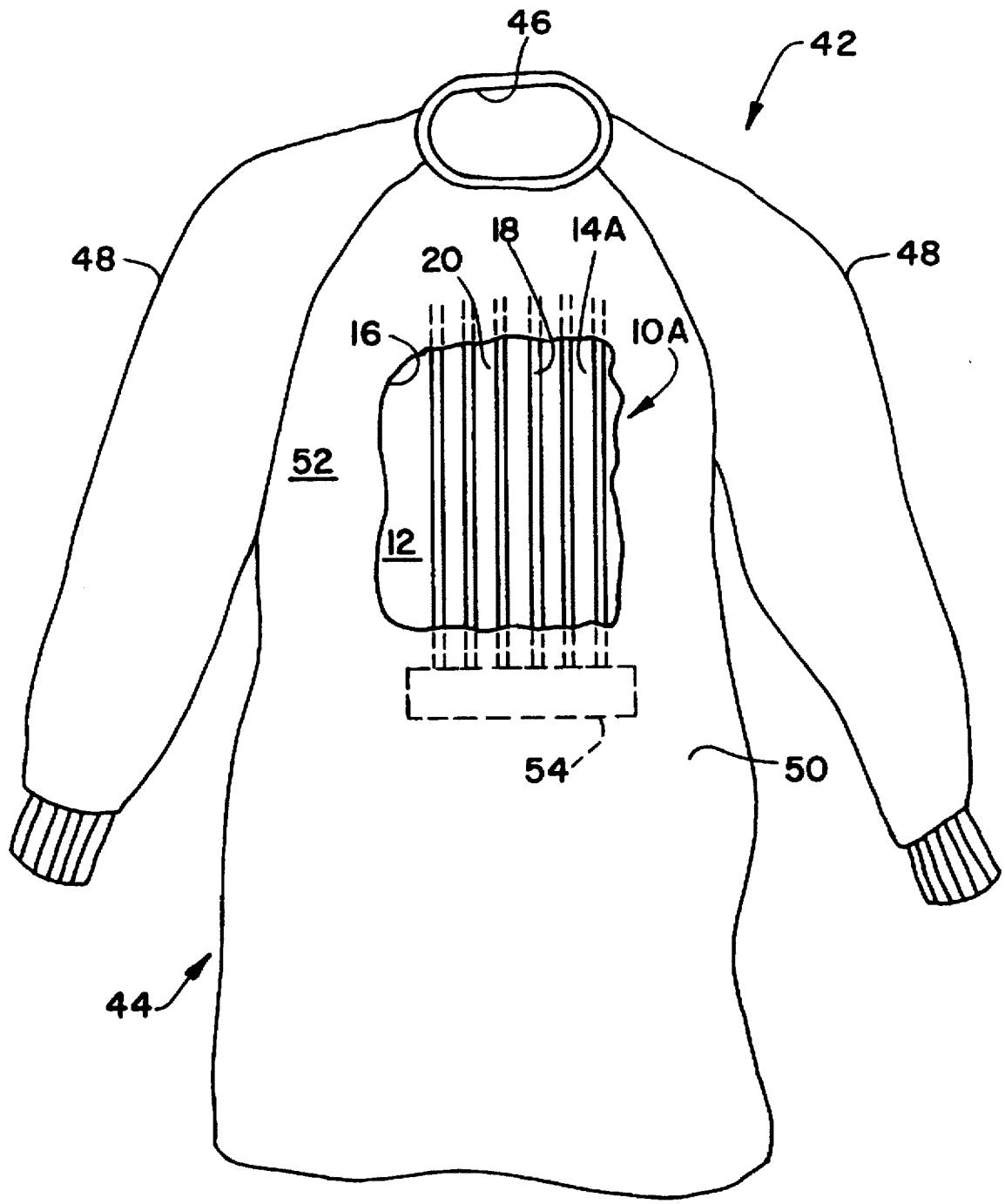
FIG. 6 is a front plan view of a surgical gown with portions removed for clarity of illustrating the embodiment illustrated in FIG. 2.

Referring now to FIG. 6, a surgical gown 42 is illustrated. The surgical gown includes a body section 44 having portions thereof defining a neck opening 46. A pair of sleeves 48 are secured to the body section 44. The body section further defines a front portion 50 and a rear portion (not shown). The front portion 50 further defines a chest portion 52. Within the area of the chest portion 52 is positioned the multi-layered structure 10A. Portions of the chest portion 52 and the porous layer 16 have been removed for clarity of illustration. As previously describe with regards to FIG. 2, the multi-layered structure 10A includes a porous hydrophobic layer 12 spaced a distance apart from a porous layer 16 by the spacing layer 14A. The spacing layer 14A is formed from a plurality of spaced apart strips 18. Channels 20 are formed between each of the strips 18.

The multi-layered structure 10A may be an independent structure not formed from materials forming the surgical gown 42. Alternatively, the material layer or layers forming the chest portion 52 of the surgical gown 42 may also form individual layers of the multi-layered structure 10A. In either case, the multi-layered structure 10A is positioned with respect to the chest portion 52 such that the porous hydrophobic layer 12 is nearer to the wearer's body, and particularly the wearer's chest, than the porous layer 16.

At one end, and desirably the lower most end, of the multi-layered structure 10A is a liquid collection area 54. The liquid collection area 54 may be secured to the multi-layered structure 10A or may be secured to the surgical gown 42. Additionally, the liquid collection area 54 may be formed from material layer(s) and/or plies forming the surgical gown 42.

Desirably, the liquid collection area 54 is in liquid communication with the channels 20. In this way, liquids entering the channels 20 of the spacing layer 14A are urged by gravity or other means, such as wicking, into the liquid collection area 54. The liquid collection area 54 may be formed from a variety of materials such as, film, spunbond nonwoven, meltblown nonwoven, spunbond/meltblown nonwoven laminate, and spunbond/meltblown/spunbond nonwoven laminate and/or any combination thereof. The liquid collection area 54 may further include an absorbent material or absorbent web, such as, for example, wood pulp, cotton, and/or coform. The liquid collection area 54 may also include an antiseptic, an antimicrobial or an antiviral agent. To prevent liquids entering the liquid collection area 54 from leaking or escaping therefrom, the liquid collection area may be film coated. Alternatively, the liquid collection area 54 may be incorporated within the spacing layer 14A (not shown). This may be accomplished by filling or partially filling some or all of the channels 20 with absorbent materials previously described as being suitable for forming the liquid collection area 54.

It will be understood that while the multi-layered structure 10A has been described in conjunction with the chest portion 52 of the surgical gown 42, any of the above described and illustrated multi-layered structures may be suitable for use, not only in the chest portion of a surgical gown but, in other parts of the surgical gown as well. Other portions of the surgical gown may include, for example, the sleeves, forearm and elbow areas. It will be further understood that any of the above described and illustrated multi-layered structures may be suitable for use in any of the previously mentioned protective garments.

EXAMPLES

The following examples demonstrate several embodiments of the present invention. Such examples, however, are not to be construed as limiting in any way either the spirit or scope of the present invention.

Example 1

SAMPLE 1 was a multi-layered structure formed from a pair of 0.8 osy (ounces per square yard) hydrophobic spunbond webs. The 0.8 osy hydrophobic spunbond webs were secured to and separated by a spacing layer formed from a plurality of elastic strips. The elastic strips were formed from KRATON® polymer (Shell Chemical Co., G-2755 thermoplastic elastomeric polymer). Each elastic strip was 1/16 inches thick and 1/8 inches wide. The elastic strips were spaced 1/4 inches apart. The spunbond layers were secured to the elastic strips by a contact adhesive present on the elastic strips.

SAMPLE 1 was then placed in a prone position on top of a sheet of pre-weighed blotter paper. The blotter paper was positioned on top of a water-filled bladder attached to a water manometer and supported by a laboratory jack. A quantity of bovine blood (1.4 ml) was applied to the upper spunbond layer spunbond layer and covered with a sheet of plastic film. This assembly was elevated by the jack until SAMPLE 1 was compressed against a fixed flat surface. The pressure applied to the SAMPLE 1 fabric was 1 psi. This pressure was applied for one minute and then released. After the pressure was released, the blotter paper and SAMPLE 1 were removed from the test apparatus. Both SAMPLE 1 and the blotter paper were analyzed and weighed for the presence of bovine blood.

RESULT: The applied pressure of 1 psi pushed the 1.4 ml of bovine blood through the upper spunbond layer and into the channels or spaces between the elastic strips. No observable or measurable quantity of the bovine blood was present on the blotter paper.

SAMPLE 2 was a multi-layered structure formed from only a pair of 0.8 osy hydrophobic spunbond webs. The spunbond webs used for forming SAMPLE 2 were substantially similar to the pair of hydrophobic spunbond webs used to form SAMPLE 1. SAMPLE 2 did not include a spacing layer.

SAMPLE 2 was then place in a prone position on top of a sheet of preweighed blotter paper. The blotter paper positioned on top of a waterfilled bladder attached to a water manometer and supported by a laboratory jack. A similar quantity of bovine blood (1.4 ml) was applied to the upper spunbond layer and covered with a sheet of plastic film. This assembly was elevated by the jack until SAMPLE 2 was compressed against a fixed flat surface. The pressure applied to the SAMPLE 2 fabric was 1 psi. This pressure was applied for one minute and then released. After the pressure was released, the blotter paper and SAMPLE 2 were removed from the test apparatus. Both SAMPLE 2 and the blotter paper were analyzed and weighed for the presence of bovine blood.

RESULT: The applied pressure of 1 psi pushed about 1.32 grams of the bovine blood through both spunbond layers and onto the blotter paper.

Example 2

Several SAMPLES were prepared having a spacing layer formed from parallel strips of laminated spunbond. Each strip was formed from eleven layers of 1.25 osy spunbond and measured 0.129 inch thick, 1/8 inch wide and 9 inches long. The strips were spaced 3/8 inch apart on the porous hydrophobic layer.

SAMPLE 3 was a 0.85 osy spunbond hydrophobic web to which the above described spacing layer was secured.

SAMPLE 4 was a 1.1 osy spunbond/meltblown/spunbond hydrophobic laminate to which the above described spacing layer was secured. The 1.1 osy spunbond/meltblown/spunbond hydrophobic laminate was treated with ZELEC®, an antistatic available from Du Pont Corporation. Each of the spunbond plies had a basis weight of 0.375 osy and the meltblown ply had a basis weight of 0.35.

SAMPLE 5 was a 1.58 osy spunbond/meltblown/spunbond hydrophobic laminate to which the above described spacing layer was secured. The 1.58 osy spunbond/meltblown/spunbond hydrophobic laminate was treated with ZEPEL® 7700, and alcohol repellent available from Du Pont Corporation. Each of the spunbond plies had a basis weight of 0.54 osy and the meltblown ply had a basis weight of 0.5.

Each SAMPLE was then place in a prone position above a piece of preweighed and measured blotter paper. The blotter paper was supported by a 1/16 inch thick by 12×12 inch square flat metal plate.

The water barrier property of each SAMPLE was evaluated by placing about one cubic centimeter of tap water at room temperature from a one cubic centimeter pipette on to the spacing layer. This quantity of water was distributed over the spacing layer in about a three inch in diameter area in droplet form. After the water was distributed over the spacing layer, a piece of Handi-Wrap® plastic film made by Dow Chemical Company was put over the spacing layer.

This assembly was then transported to a PHI press made by PHI, City of Industry, Calif., Model No. 0230-X1-4B-7. The jaws of the press were then closed such that pressure was gradually applied to each assembly. When the desired pressure was reached, the assembly was maintained under this pressure for a period of about 1 minute. After 1 minute, the pressure was released and the blotter paper separated from the SAMPLE and weighed. The weight difference between the blotter paper, before and after compression, indicated the amount of water, if any, which passed through the SAMPLE. The amount of water which passed through the SAMPLE is reported in TABLES I-III as a percentage of the total amount of water placed on the spacing layer. TABLES I-III report the performance of these SAMPLES at various pressures as well as the performance of control fabrics at various pressures. The control fabrics were merely the respective hydrophobic fabrics described above without a spacing layer.

TABLE I

| SAMPLE 3 | | | CONTROL | | |
|---|---|---|---|---|---|
| RUN | PSI | % Water | RUN | PSI | % Water |
| 1 | 9.3 | 1 | 1 | 1.85 | 92 |
| 2 | 100 | 1 | 2 | 1.85 | 96 |
| 3 | 100 | 1 | 3 | 3.2 | 88 |

TABLE II

| SAMPLE 4 | | | CONTROL | | |
|---|---|---|---|---|---|
| RUN | PSI | % Water | RUN | PSI | % Water |
| 1 | 0.58 | 1 | 1 | 0.42 | 20 |
| 2 | 1.75 | 1 | 2 | 0.83 | 13 |
| 3 | 18.5 | 0 | 3 | 4.2 | 90 |
| 4 | 55.6 | 1 | | | |

TABLE III

| SAMPLE 5 | | | CONTROL | | |
|---|---|---|---|---|---|
| RUN | PSI | % Water | RUN | PSI | % Water |
| 1 | 2.9 | 1 | 1 | 0.42 | 8 |
| 2 | 11.7 | −1 | 2 | 0.42 | 9 |
| | | | 3 | 0.83 | 10 |
| | | | 4 | 1.85 | 24 |
| | | | 5 | 5.55 | 57 |
| | | | 6 | 7.9 | 43 |

Finally, one of the SAMPLE 3 multi-layered fabrics was prepared as described above, except that no water was applied to the spacing layer. This sample was then compressed in the PHI press for one minute at 11.7 psi. The before and after compression weights of the blotter paper were then compared. The post compression weight was approximately 0.02 grams higher than the pre-compression weight.

Conclusions: With regard to SAMPLES 1, and 3-5, after each compression run, there was no bovine blood (SAMPLE 1) or water (SAMPLES 3-5) either visibly present or detectable by weighing (to 1/100 of a gram) on the blotter paper. From these empirically derived data and the methods used to gather the same, it was concluded that no detectable quantity of liquid, either bovine blood or water, passed through the porous hydrophobic layer when the spacing layer, being contacted with such liquid, was subjected to a compressive pressure.

The values reported under the columns "% Water" for SAMPLES 3-5 appear to have resulted from either scale error and/or pressure-induced transfer of some of the adhesive used to secure the strips of spunbond to the porous hydrophobic layer from the porous hydrophobic layer to the blotter paper. The data reported above for the compression run for the SAMPLE 3 fabric without water being applied to the spacing layer supports this conclusion.

With regards to SAMPLE 2 and the CONTROLS (only the hydrophobic layers of SAMPLES 3-5), significant quantities of bovine blood (SAMPLE 2) and water (CONTROLS) penetrated these fabrics at pressures as low as 0.42 psi (see TABLE II, CONTROL, RUN 1) and 1 psi (see SAMPLE 2).

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. A multi-layered structure comprising:
   a fibrous porous hydrophobic layer;
   a spacing layer in adjacent juxtaposition to the porous hydrophobic layer;
   a liquid collection area in liquid communication with the spacing layer; and
   wherein, upon the spacing layer being contacted with water and subjected to a compressive pressure of at least 2 pounds per square inch in a direction generally perpendicular to the spacing layer, none of the water passes through the fibrous porous hydrophobic layer.

2. The multi-layered structure of claim 1, wherein the fibrous porous hydrophobic layer is formed from a nonwoven web.

3. The multi-layered structure of claim 1 wherein the spacing layer is formed by a member selected from a group which includes glass fibers, thermoplastic fibers, cellulose fibers, a plurality of spaced apart support members or any combination thereof.

4. The multi-layered structure of claim 3 wherein at least one of the support members is corrugated.

5. The multi-layered structure of claim 3 wherein the area between at least two support members defines a channel.

6. The multi-layered structure of claim 3 wherein the support members are further defined as a plurality of spaced apart elastic strips.

7. The multi-layered structure of claim 1 wherein, upon the spacing layer being contacted with water and subjected to a compressive pressure of at least 5 pounds per square inch in a direction generally perpendicular to the spacing layer, none of the water passes through the fibrous porous hydrophobic layer.

8. The multi-layered structure of claim 1 wherein, upon the spacing layer being contacted with water and subjected to a compressive pressure of at least 10 pounds per square inch in a direction generally perpendicular to the spacing layer, none of the water passes through the fibrous porous hydrophobic layer.

9. A surgical gown formed from the multi-layered structure of claim 1.

10. A surgical drape formed from multi-layered structure of claim 1.

11. A coverall formed from the multi-layered structure of claim 1.

12. A nonwoven multi-layered web comprising:
a hydrophobic nonwoven web layer spaced a distance apart from a nonwoven web layer by a spacing layer;
a liquid collection area in liquid communication with the spacing layer; and
wherein upon the nonwoven web layer being contacted with water and subjected to a compressive pressure of at least 2 psi, none of the water passes through the hydrophobic nonwoven web layer.

13. The nonwoven multi-layered web of claim 12 wherein the spacing layer is formed by a member selected from a group which includes glass fibers, thermoplastic fibers, cellulose fibers, a plurality of spaced apart support members or any combination thereof.

14. The nonwoven multi-layered web of claim 13 wherein the area between the plurality of spaced apart support members defines a plurality of channels and wherein the collection area is formed from an absorbent material positioned within a portion of the channels.

15. The nonwoven multi-layered web of claim 13 wherein a surface of at least one of the support members is corrugated.

16. The nonwoven multi-layered web of claim 13 wherein the area between at least two support members defines a channel.

17. The nonwoven multi-layered web of claim 13 wherein the support members are further defined as a plurality of spaced apart elastic strips.

18. The nonwoven multi-layered web of claim 12 wherein the nonwoven web layer is further characterized as another hydrophobic nonwoven web layer.

19. The nonwoven multi-layered web of claim 12 wherein the hydrophobic nonwoven web layer may be formed from a plurality of layers.

20. The nonwoven multi-layered web of claim 12 wherein the nonwoven web layer may be formed from a plurality of layers.

21. The nonwoven multi-layered web of claim 13 wherein at least two of the support members intersect.

22. A multi-layered structure comprising:
a fibrous porous hydrophobic layer;
a spacing layer in adjacent juxtaposition to the porous hydrophobic layer; and
wherein, upon the spacing layer being contacted with water and subjected to a compressive pressure of at least 2 pounds per square inch in a direction generally perpendicular to the spacing layer, none of the water passes through the fibrous porous hydrophobic layer.

23. The multi-layered structure of claim 22 wherein the porous hydrophobic layer is formed from a fibrous nonwoven web.

24. The multi-layered structure of claim 22 wherein the spacing layer is formed by a member selected from a group which includes glass fibers, thermoplastic fibers, cellulose fibers, a plurality of spaced apart support members or any combination thereof.

25. The multi-layered structure of claim 24 wherein at least one of the support members is corrugated.

26. The multi-layered structure of claim 24 wherein the area between at least two support members defines a channel.

27. The multi-layered structure of claim 24 wherein the support members are further defined as a plurality of spaced apart elastic strips.

28. The multi-layered structure of claim 22 wherein, upon the spacing layer being contacted with water and subjected to a compressive pressure of at least 5 pounds per square inch in a direction generally perpendicular to the spacing layer, none of the water passes through the fibrous porous hydrophobic layer.

29. The multi-layered structure of claim 22 wherein, upon the spacing layer being contacted with water and subjected to a compressive pressure of at least 10 pounds per square inch in a direction generally perpendicular to the spacing layer, none of the water passes through the fibrous porous hydrophobic layer.

30. A surgical gown formed from the multi-layered structure of claim 22.

31. A surgical drape formed from the multi-layered structure of claim 22.

32. A coverall formed from the multi-layered structure of claim 22.

33. A multi-layered structure comprising:
a fibrous porous hydrophobic layer;
a spacing layer in adjacent juxtaposition to the porous hydrophobic layer; and
a fibrous porous layer in adjacent juxtaposition to the spacing layer; and
wherein, upon the spacing layer being contacted with water and subjected to a compressive pressure of at least 2 pounds per square inch in a direction generally perpendicular to the spacing layer, none of the water passes through the fibrous porous hydrophobic layer.

34. The multi-layered structure of claim 33 wherein the fibrous porous hydrophobic layer is formed from a nonwoven web.

35. The multi-layered structure of claim 33 wherein the fibrous porous layer is formed from a nonwoven web.

36. The multi-layered structure of claim 33 wherein the spacing layer is formed by a member selected from a group which includes glass fibers, thermoplastic fibers, cellulose fibers, a plurality of spaced apart support members or any combination thereof.

37. The multi-layered structure of claim 36 wherein at least one of the support members is corrugated.

38. The multi-layered structure of claim 36 wherein the area between at least two support members defines a channel.

39. The multi-layered structure of claim 36 wherein the support members are further defined as a plurality of spaced apart elastic strips.

40. The multi-layered structure of claim 33 wherein, upon the spacing layer being contacted with water and subjected to a compressive pressure of at least 5 pounds per square inch in a direction generally perpendicular to the spacing layer, none of the water passes through the fibrous porous hydrophobic layer.

41. The multi-layered structure of claim 33 wherein, upon the spacing layer being contacted with water and subjected to a compressive pressure of at least 10 pounds per square inch in a direction generally perpendicular to the spacing layer, none of the water passes through the fibrous porous hydrophobic layer.

42. A surgical gown formed from the multi-layered structure of claim 33.

43. A surgical drape formed from the multi-layered structure of claim 33.

44. A coverall formed from the multi-layered structure of claim 33.

* * * * *